(12) United States Patent
Tam et al.

(10) Patent No.: US 9,231,655 B2
(45) Date of Patent: Jan. 5, 2016

(54) SYSTEM AND METHOD FOR POWER CONTROL IN A PHYSICAL LAYER DEVICE

(75) Inventors: Derek Tam, Irvine, CA (US); Xin Wang, Tustin, CA (US); Hui Pan, Irvine, CA (US); Joseph Aziz, Irvine, CA (US)

(73) Assignee: BROADCOM CORPORATION, Irvine, CA (US)

( * ) Notice: Subject to any disclaimer, the term of this patent is extended or adjusted under 35 U.S.C. 154(b) by 652 days.

(21) Appl. No.: 13/446,454

(22) Filed: Apr. 13, 2012

(65) Prior Publication Data

US 2013/0268782 A1 Oct. 10, 2013

Related U.S. Application Data

(60) Provisional application No. 61/621,287, filed on Apr. 6, 2012.

(51) Int. Cl.
| | | |
|---|---|---|
| *G06F 1/26* | (2006.01) | |
| *H04B 3/00* | (2006.01) | |
| *H04L 12/12* | (2006.01) | |

(52) U.S. Cl.
CPC *H04B 3/00* (2013.01); *H04L 12/12* (2013.01); *Y02B 60/34* (2013.01); *Y02B 60/35* (2013.01)

(58) Field of Classification Search
CPC ... G06F 1/3209; G06F 1/3234; H04L 1/0002; H04L 1/0006; H04L 1/0023; H04L 12/12; H04B 3/00; Y02B 60/34; Y02B 60/35
USPC ............................ 713/310, 323, 324; 370/318
See application file for complete search history.

(56) References Cited

U.S. PATENT DOCUMENTS

| | | | | |
|---|---|---|---|---|
| 6,614,854 | B1* | 9/2003 | Chow et al. ................. | 375/297 |
| 6,662,019 | B2* | 12/2003 | Kamel ................ | H04L 1/0002 |
| | | | | 370/335 |
| 6,978,151 | B2* | 12/2005 | Choi et al. .................... | 455/522 |
| 7,006,795 | B2* | 2/2006 | Foschini et al. ....... | H04L 1/0002 |
| | | | | 370/335 |
| 7,328,037 | B2* | 2/2008 | Tsien et al. ................... | 455/522 |
| 7,889,759 | B2* | 2/2011 | Monk et al. .................. | 370/465 |
| 8,261,001 | B2* | 9/2012 | Bobrek ........................ | 710/310 |
| 2008/0240412 | A1 | 10/2008 | Mezer et al. | |

(Continued)

FOREIGN PATENT DOCUMENTS

| | | |
|---|---|---|
| CN | 1272979 | 11/2000 |
| CN | 101873154 | 10/2010 |

(Continued)

OTHER PUBLICATIONS

KIPO Office Action, Apr. 23, 2014.

(Continued)

*Primary Examiner* — Thuan Du
(74) *Attorney, Agent, or Firm* — Foley & Lardner LLP; Christopher J. McKenna; Angela D. Murch (57) ABSTRACT

A system and method for power control in a physical layer device. Energy savings during an active state can be produced through the monitoring of a received signal level by a receiver in a physical layer device. In one embodiment, based on an indication of the received signal level or other communication characteristic of the transmission medium, a control module can adjust the signal level or amplitude and/or adjust the voltage supply.

20 Claims, 6 Drawing Sheets

(56) References Cited

U.S. PATENT DOCUMENTS

| | | |
|---|---|---|
| 2009/0154365 A1 | 6/2009 | Diab et al. |
| 2009/0187778 A1* | 7/2009 | Diab et al. ................... 713/322 |
| 2011/0167291 A1* | 7/2011 | Liu et al. ...................... 713/340 |
| 2012/0016553 A1* | 1/2012 | Bai ................................. 701/33 |
| 2012/0052928 A1 | 3/2012 | Lu |

FOREIGN PATENT DOCUMENTS

| | | |
|---|---|---|
| CN | 101964679 | 2/2011 |
| KR | 10-0969222 | 7/2010 |
| KR | 10-2011-0120979 | 11/2011 |

OTHER PUBLICATIONS

EP Search Report, Sep. 13, 2013.
Yarmarkov, Aviad, "TLK110 Power Back Off for Short Cables," Texas Instruments, Jul. 2012.
PHYTER® Industrial Temperature 10/100 Mbs Ethernet Physical Layer Transceiver, Texas Instruments, Dec. 1, 2011.
TW Office Action, Aug. 25, 2014.
Office Action for Chinese Patent Application No. 2012103663604 mailed Nov. 2, 2015 (including English summary).

* cited by examiner

SYSTEM AND METHOD FOR POWER CONTROL IN A PHYSICAL LAYER DEVICE

This application claims priority to provisional patent application No. 61/621,287, filed Apr. 6, 2012, which is incorporated by reference herein, in its entirety, for all purposes.

BACKGROUND

1. Field of the Invention

The present invention relates generally to networking and, more particularly, to a system and method for power control in a physical layer device.

2. Introduction

Energy costs continue to escalate in a trend that has accelerated in recent years. Such being the case, various industries have become increasingly sensitive to the impact of those rising costs. One area that has drawn increasing scrutiny is the IT infrastructure. Many companies are now looking at their IT systems' power usage to determine whether the energy costs can be reduced. For this reason, an industry focus on energy efficient networks (IEEE 802.3az) has arisen to address the rising costs of IT equipment usage as a whole (i.e., PCs, displays, printers, switches, servers, network equipment, etc.).

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Energy savings can be produced through the monitoring of a received signal level by a receiver in a physical layer device (PHY). In one embodiment, based on an indication of the received signal level (e.g., voltage swing level) or other communication characteristic of the transmission medium, a control module can adjust the signal level or amplitude used by the transmission subsystem, thereby producing energy savings. In contrast to energy efficient networks that are dependent on an identification of a low traffic utilization condition to transition to an energy saving state, energy savings can be produced during the active state of a transmission subsystem.

It is a feature of the present invention that energy efficiency of a network device can be increased through the identification of energy saving opportunities beyond the limited circumstances presented through low link utilization conditions. For example, while a transmission subsystem can produce energy savings during periods of low link utilization by entering an energy saving state such as a low power idle mode or a subset physical layer device mode, energy savings can also be produced when a transmission subsystem is in an active state where transmission occurs at the highest link rate possible. As high power consumption during the active state leads to the use of expensive package to accommodate the thermal dissipation, lower power consumption can enable lower cost packaging. The resulting cost savings can be significant, especially when considering the low additional cost needed to implement the features of the present invention.

In one embodiment, energy savings during an active state is produced through the monitoring of a received signal level by a receiver PHY. An indication of the received signal level during transmission in the active state can be provided to a control module. Based on the indication of the received signal level, the control module can then determine whether energy savings can be produced during the active state. In various examples, the control module can directly or indirectly impact the transmit power of the transmitter in the PHY, thereby producing energy savings during the active state.

Figure 1:
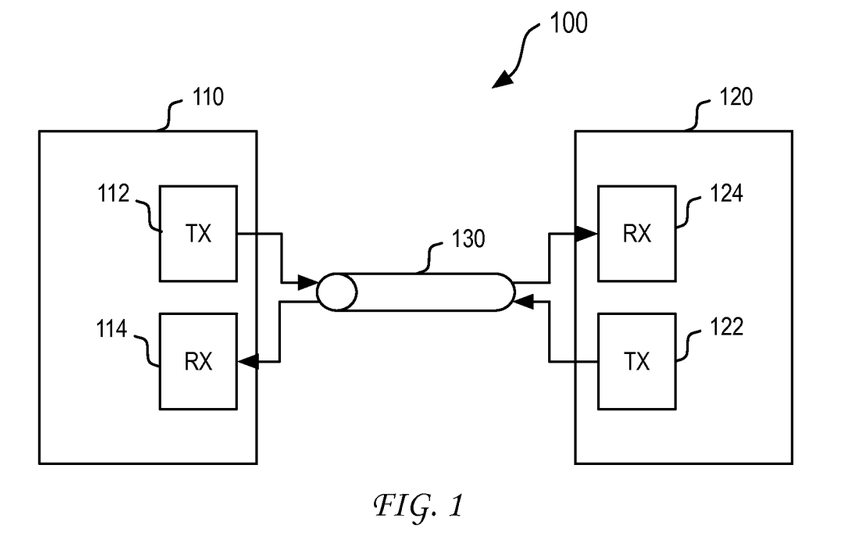
FIG. 1 illustrates an example of a network link.

To illustrate the various features of the present invention, reference is first made to FIG. 1, which illustrates an example of a network link. As illustrated, network link 100 includes link partners 110, 120, which are coupled using a communication channel 130 (e.g., copper twisted pair cable). Here, it should be noted that while communication channel 130 is illustrated in the form of a cable conduit, the potential embodiment of communication channel 130 is not so limited. As used herein, communication channel 130 can represent any transmission medium that is usable by link partners.

As further illustrated in FIG. 1, link partner 110 includes transmitter 112 and receiver 114, while link partner 120 includes transmitter 122 and receiver 124. As would be apparent, transmitter 112 in link partner 110 is designed to transmit communication signals to receiver 124 in link partner 120, while transmitter 122 in link partner 120 is designed to transmit communication signals to receiver 114 in link partner 110.

Figure 2A:
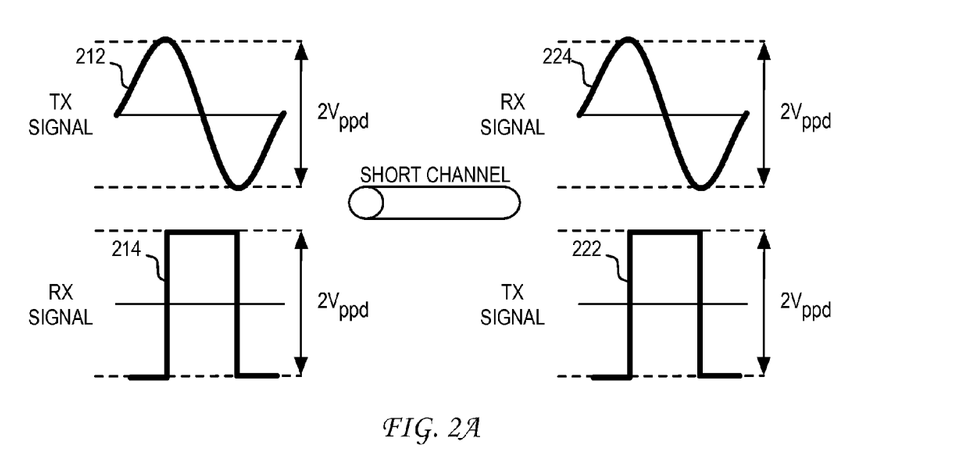
FIGS. 2A and 2B illustrate examples of transmission and reception in a network link.
Figure 2B:
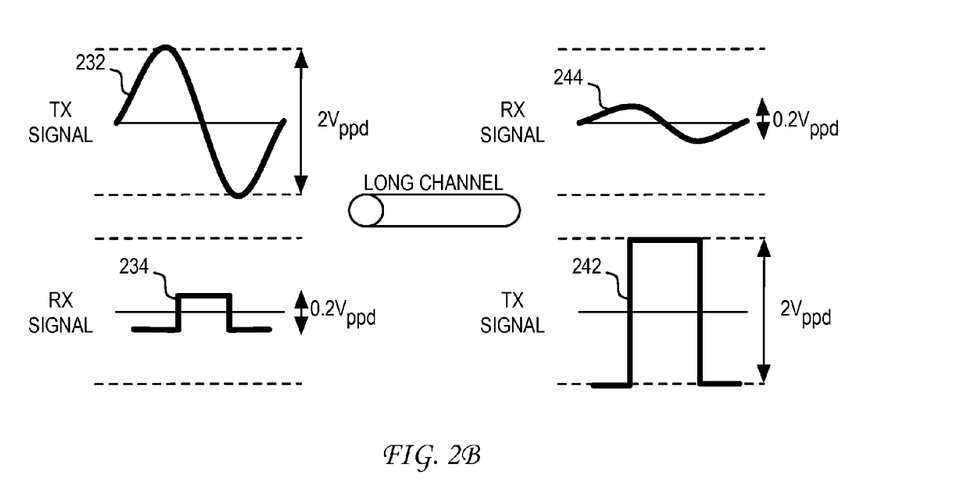

FIGS. 2A and 2B illustrate examples of transmission and reception in a network link exemplified by FIG. 1. In this example illustration, FIG. 2A illustrates the signals that are transmitted and received through a "short" channel, while FIG. 2B illustrates the signals that are transmitted and received through a "long" channel. It should be noted that the particular channel designations of "short" and "long" are intended to represent different characteristics of a communication channel and may or may not have a direct correlation to the physical length of a particular type of transmission medium.

As illustrated in FIG. 2A, signal 212 is transmitted by transmitter 112 in link partner 110 over a "short" channel and received as signal 224 at receiver 124 in link partner 120. Similarly, signal 222 is transmitted by transmitter 122 in link partner 120 over the "short" channel and received as signal 214 at receiver 114 in link partner 110. As illustrated, the "short" channel has a minimal impact as received signal 224 is insubstantially degraded as compared to the transmitted signal 212, and received signal 214 is insubstantially degraded as compared to the transmitted signal 222. This illustrates the minimal signal attenuation caused by the "short" channel. This would be the case, for example, where the "short" channel represents a network patch cable under 10 meters in length.

FIG. 2B illustrates an impact of a "long" channel. Consider, for example, a network cable that is near 100 meters in length. As illustrated, signal 232 is transmitted by transmitter 112 in link partner 110 over a "long" channel and received as signal 244 at receiver 124 in link partner 120. Similarly, signal 242 is transmitted by transmitter 122 in link partner 120 over the "long" channel and received as signal 234 at receiver 114 in link partner 110. As illustrated, the "long" channel has a significant impact as received signal 244 is substantially degraded as compared to the transmitted signal 232, and received signal 234 is substantially degraded as compared to the transmitted signal 242. This illustrates the significant signal attenuation caused by the "long" channel.

As demonstrated, the characteristics of the transmission medium can significantly impact the received signal level. It is a feature of the present invention that energy savings can be produced through an exploitation of variations in the received signal level. In particular, it is recognized that energy savings can be achieved through the leveraging of the capabilities of a receiver in handling large attenuation effects in worst-case or near worst case communication characteristics of the transmission medium.

Figure 3:
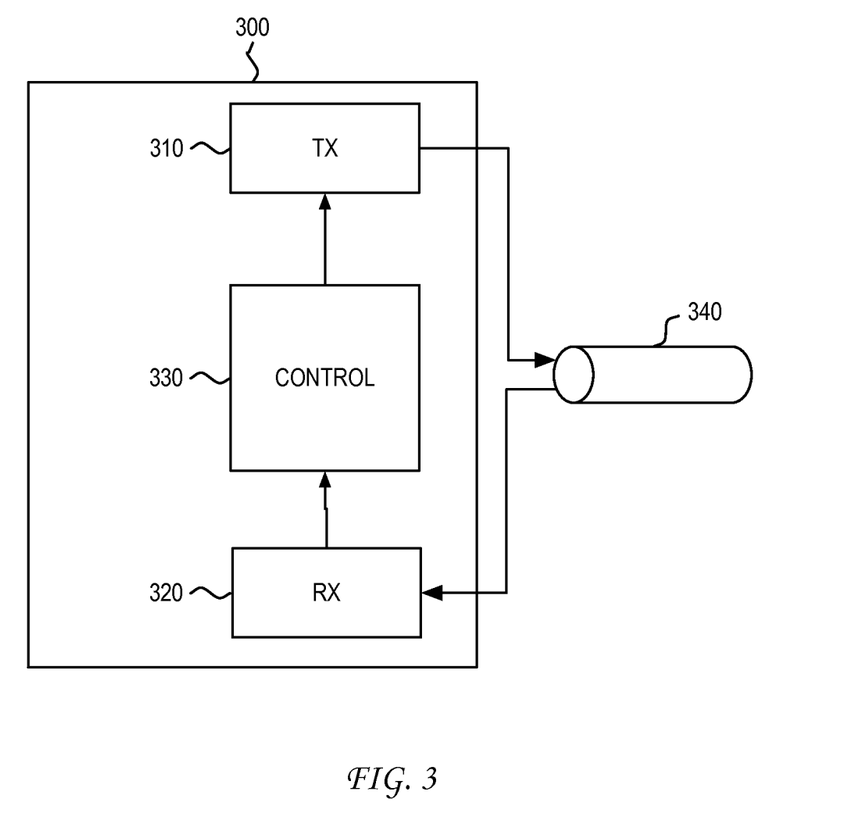
FIG. 3 illustrates a first embodiment of power control in a physical layer device.

FIG. 3 illustrates an embodiment of power control in a physical layer device that can exploit variances in the communication characteristics of the transmission medium. As illustrated, link partner 300 includes transmitter 310 and receiver 320, which are designed to transmit and receive signals via transmission medium 340. As further illustrated, link partner 300 includes control module 330. In one embodiment, transmitter 310, receiver 320 and control module 330 are incorporated in a PHY of link partner 300.

In one embodiment, control module 330 is configured to receive information from receiver 320 that enables control module 330 to identify a power level of a signal received via transmission medium 340. Effectively, this identification of the power level of the received signal would enable the control module to determine characteristics of the communication channel represented by the transmission medium. If a high power level is identified, then control module 330 can determine that a "short" channel is present, whereas if a low power level is identified, then control module 330 can determine that a "long" channel is present.

The determination of the existence of a "short" or "long" channel would enable control module to generate a control signal that enables transmitter to adapt to the particular communication characteristics of the transmission medium. For example, if control module 330 determined that a "short" channel was present, then control module 330 can generate a control signal that would instruct transmitter 310 that a lower power signal can be transmitted. Here, the transmission of a lower power signal can be designed to ensure that the signal level at the receiver would have a sufficient signal-to-noise (SNR) ratio to enable decoding at a reasonable error rate.

From the receiver's perspective, the received signal was the same if not better than a signal received over a "long" channel. As the receiver is designed to handle large attenuation effects in worst-case or near worst case communication characteristics of the transmission medium, the self-imposed attenuation by the transmitter would have little to no impact on the active communications.

As would be appreciated, the lowering of the transmit power by the transmitter would lead to energy savings. These energy savings would be significant when considered the many network links that are based on relatively "short" channels. For example, home gateways and small-medium business (SMB) markets have network links that are predominately short. The potential energy savings in these environments is therefore relatively large.

Figure 4:
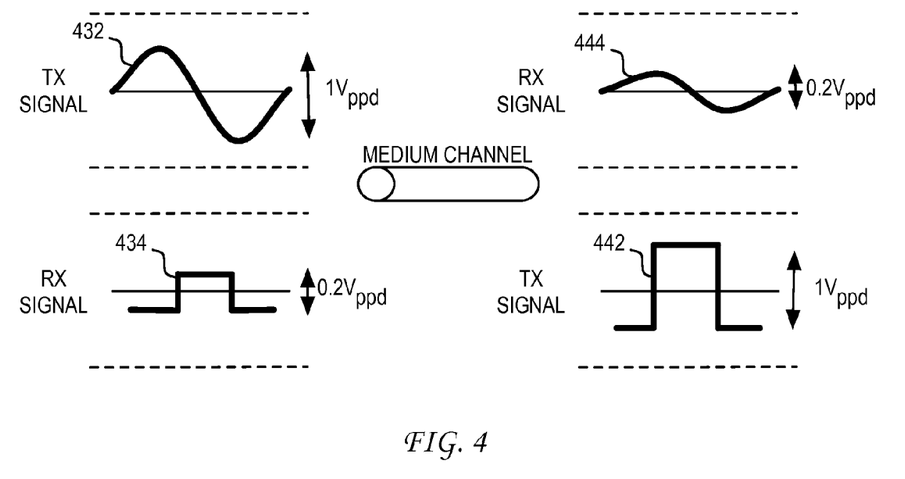
FIG. 4 illustrates a further example of transmission and reception in a network link.

FIG. 4 illustrates a further example of transmission and reception in a network link using the principles of the present invention. In this illustration, a "medium" channel exists such that an amount of attenuation lower than the worst-case attenuation exists. In this example, the control module has lowered the transmit power by one half relative to the standard transmit power. This lowering of the transit power by one half can be in response to a determination that a half-power transmission would still result in the receipt of a signal level sufficient for proper decoding by the receiver. As would be appreciated, the amount by which the control module lowers the transmit power would be determined based on the power level of the received signal. In effect, the determined characteristics of the transmission medium enables the control module to identify a transmit power that would be sufficient for that particular network link.

As would be appreciated, the various mechanisms can be used by the control module to determine the communication characteristics of the transmission medium. In various embodiments, the control module can be designed to receive input from an analog-digital converter (ADC) module, an automatic gain control (AGC) module, a cable diagnostic module, etc. In one example, a cable diagnostic module can be designed to measure the length and/or type of cable, which would enable the control module to determine the communication characteristics of the transmission medium. In general, any input that is measured or otherwise provided to the control module can be used in the generation of a control signal that can produce energy savings.

Figure 5:
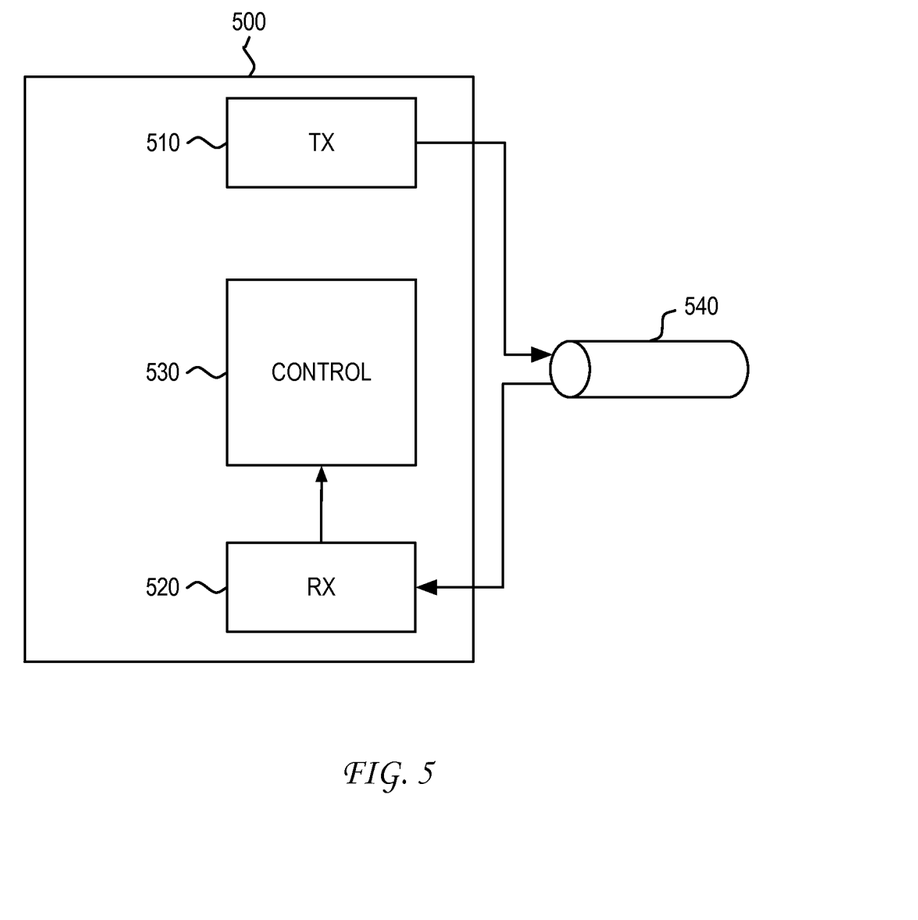
FIG. 5 illustrates a second embodiment of power control.

FIG. 5 illustrates another embodiment of power control. As illustrated, link partner 500 includes transmitter 510 and receiver 520, which are designed to transmit and receive signals via transmission medium 540. As further illustrated, link partner 500 includes control module 530.

In a similar manner to the embodiment of FIG. 3, control module 530 is configured to receive information from receiver 320 (or other component that has access to information that enables a determination of the communication characteristics of the transmission medium) that enables control module 530 to identify a level of a variable voltage supply that powers at least a transmitter portion of link partner 500. Effectively, the identification of the characteristics of the communication channel represented by the transmission medium would enable control module to determine how much power is needed to drive transmitter 510. Thus, if a "long" channel is present, then the variable voltage supply can be set by control module 530 at a relatively high level, while if a "short" channel is present, then the variable voltage supply can be set by control module 530 at a relatively low level.

Figure 6:
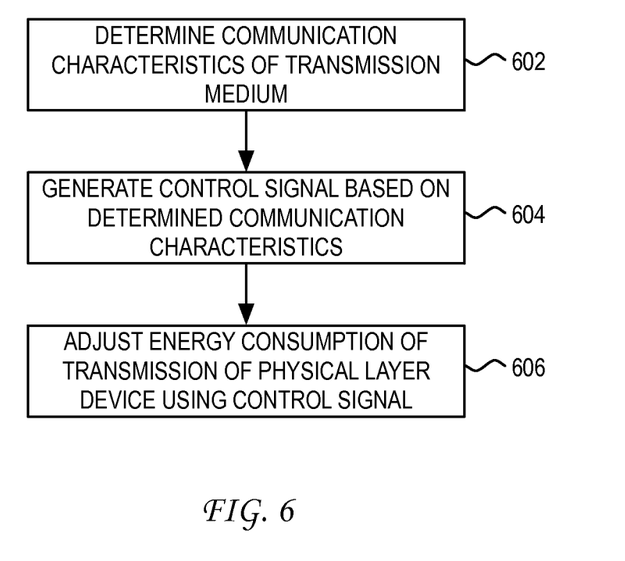
FIG. 6 illustrates a flowchart of an example process of power control.

Having described a mechanism for generating energy savings during an active mode of communication, reference is now made to the flowchart of FIG. 6, which illustrates a process of the present invention. As illustrated, the process begins at step 602 where the communication characteristics of a transmission medium are determined. In one embodiment, the determination of the communication characteristics can be based on a single measure that directly identifies those communication characteristics. For example, the communication characteristics can be determined directly based on a received signal strength indicator that directly identifies a level of attenuation that can be expected over the transmission medium. In another embodiment, the determination of the communication characteristics can be based on attributes of the of the transmission medium. For example, the communication characteristics can be determined using an identification of a cable length and a cable type (e.g., Category 3, 5e, 6, etc. Ethernet cabling).

The determination of the communication characteristics of the transmission medium enables a control module in a link partner to generate, at step 604, a control signal that can produce energy savings. This control signal can be based on the determined communication characteristics and can be designed, for example, to identify a reduced transmission performance that would not compromise the SNR at the receiving end. As would be appreciated, the particular relationship between the generated control signal and the determined communication characteristics would be dependent on the particular inputs used in such a determination and the corresponding control mechanism used to effect energy savings. In general, it should be noted that the control mechanism can be preset to a fixed value after link-up or adaptive and dynamic in its ability to respond to changes in the communication characteristics of the transmission medium.

At step 606, the generated control signal is then used to adjust the energy consumption of the transmission subsystem in the physical layer device. As noted, this adjustment can be performed in various ways, wherein the desired result is to relax the power requirements of the transmission subsystem in producing a sufficient SNR at the receiving end. In one embodiment, the transmit signal amplitude can be adjusted. In another embodiment, the voltage supply for at least part of the transmission subsystem can be adjusted through an on-chip/off-chip voltage regulator. As would be appreciated, the particular adjustment mechanism can be implemented in hardware and/or software.

As has been described, an energy saving mechanism can be used in an active mode to complement the energy efficiency efforts that are applied during periods of low-link utilization. As would be appreciated, the principles of the present invention can be applied to various PHY systems and is not limited to a particular link rate (standardized or non-standardized) being employed. Further, the principles of the present invention can be used in various PHY types, which are applied to different types of transmission mediums.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method, comprising:
   receiving a signal from a communication channel, by a receiver in a local physical layer device;
   identifying a power level of said received signal;
   determining characteristics of said communication channel from said power level;
   generating a control signal based on a said characteristics; and
   adjusting, using said control signal during an active operating mode of said local physical layer device, an amplitude of a transmission signal delivered by said local physical layer device to said communication channel.

2. The method of claim 1, wherein determining said characteristics of said communication channel from said power level includes determining a signal attenuation of said signal.

3. The method of claim 2, wherein said signal attenuation is determined using an automatic gain control module.

4. The method of claim 2, wherein said signal attenuation is determined using a cable diagnostic module.

5. The method of claim 4, wherein said cable diagnostic module determines a length of a network cable of the communication channel.

6. The method of claim 2, wherein said signal attenuation is determined using a received signal strength indicator.

7. A method, comprising:
   receiving a signal via a communication channel, by a receiver in a local physical layer device;
   generating a control signal based on an indication of a signal attenuation of said signal, the signal attenuation reflecting characteristics of the communication channel; and
   adjusting, using said generated control signal, an output of a power supply coupled to said local physical layer device.

8. The method of claim 7, wherein said local physical layer device is an Ethernet physical layer device.

9. The method of claim 7, wherein said indication of said signal attenuation is determined using an analog digital converter module.

10. The method of claim 7, wherein said indication of said signal attenuation is determined using an automatic gain control module.

11. The method of claim 7, wherein said indication of said signal attenuation is determined using a cable diagnostic module.

12. The method of claim 11, wherein said cable diagnostic module determines a length of a network cable.

13. The method of claim 7, wherein said indication of said signal attenuation is determined using a received signal strength indicator.

14. A physical layer device, comprising:
   a receiver coupled to a network cable and figured to receive a signal via the network cable;
   a control module configured to:
      determine characteristics of the network cable from an attenuation of the received signal,
      generate a control signal based on said attenuation; and
      provide said control signal during an active operating mode, to adjust an amount of power used during a transmission from said physical layer device.

15. The physical layer device of claim 14, wherein said control signal is used to adjust an amplitude of a transmission signal delivered to the network cable.

16. The physical layer device of claim 14, wherein said control signal is used to adjust an output of a power supply used by at least part of a transmitter.

17. The physical layer device of claim 14, wherein said control module generates said control signal based on an output of an analog digital converter module.

18. The physical layer device of claim 14, wherein said control module generates said control signal based on an output of an automatic gain control module.

19. The physical layer device of claim 14, wherein said control module generates said control signal based on an output of a cable diagnostic module.

20. The physical layer device of claim 14, wherein said control module generates said control signal based on a received signal strength indicator.

\* \* \* \* \*